United States Patent [19]
Paul et al.

[11] Patent Number: 4,858,566
[45] Date of Patent: Aug. 22, 1989

[54] AXIALLY SYMMETRICAL PISTON FOR RECIPROCAL ENGINES

[76] Inventors: Marius A. Paul; Ana Paul, both of 969 La Paz, Placentia, Calif. 92670

[21] Appl. No.: 168,981

[22] Filed: Mar. 16, 1988

[51] Int. Cl.⁴ .............................................. F01P 1/04
[52] U.S. Cl. .............................. 123/41.35; 123/193 P; 92/181 R
[58] Field of Search ..................... 123/193 P, 254, 276, 123/279, 41.35; 92/181 R, 176, 187

[56] References Cited

U.S. PATENT DOCUMENTS

| | | | |
|---|---|---|---|
| 1,814,781 | 7/1931 | Bailey | 123/41.35 |
| 3,335,643 | 8/1967 | Wentworth | 123/193 P |
| 3,628,511 | 12/1971 | Fischer | 123/41.16 |
| 4,056,044 | 11/1977 | Kamman et al. | 123/41.35 |
| 4,270,494 | 6/1981 | Garter et al. | 123/193 P |
| 4,372,179 | 2/1983 | Dolenc et al. | 92/187 |
| 4,517,930 | 5/1985 | Nakano et al. | 123/193 P |
| 4,617,887 | 10/1986 | Nagase et al. | 123/193 P |
| 4,791,787 | 12/1988 | Paul | 60/605.1 |

*Primary Examiner*—E. Rollins Cross
*Attorney, Agent, or Firm*—Bielen and Peterson

[57] ABSTRACT

A piston assembly for high-pressure, high-temperture, internal combustion engines, the piston assembly having a piston unit with a piston head and a piston skirt which interconnect to form a substantially sperical internal socket, the assembly also having a wrist pin unit with a substantially spherical ball engageable in the socket of the piston unit, the ball being connected to a connecting rod through the wristpin for limited articulation of the connecting rod and free rotation of the piston unit on the ball of the wrist pin unit, the piston assembly also having a recessed combustion chamber with cooling features.

12 Claims, 2 Drawing Sheets

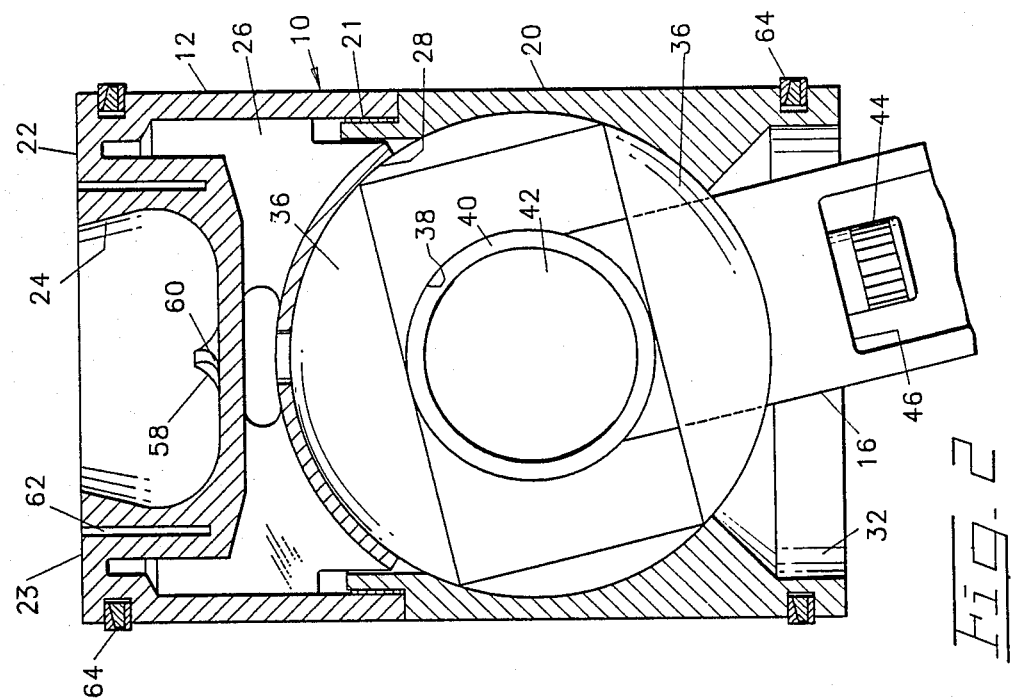
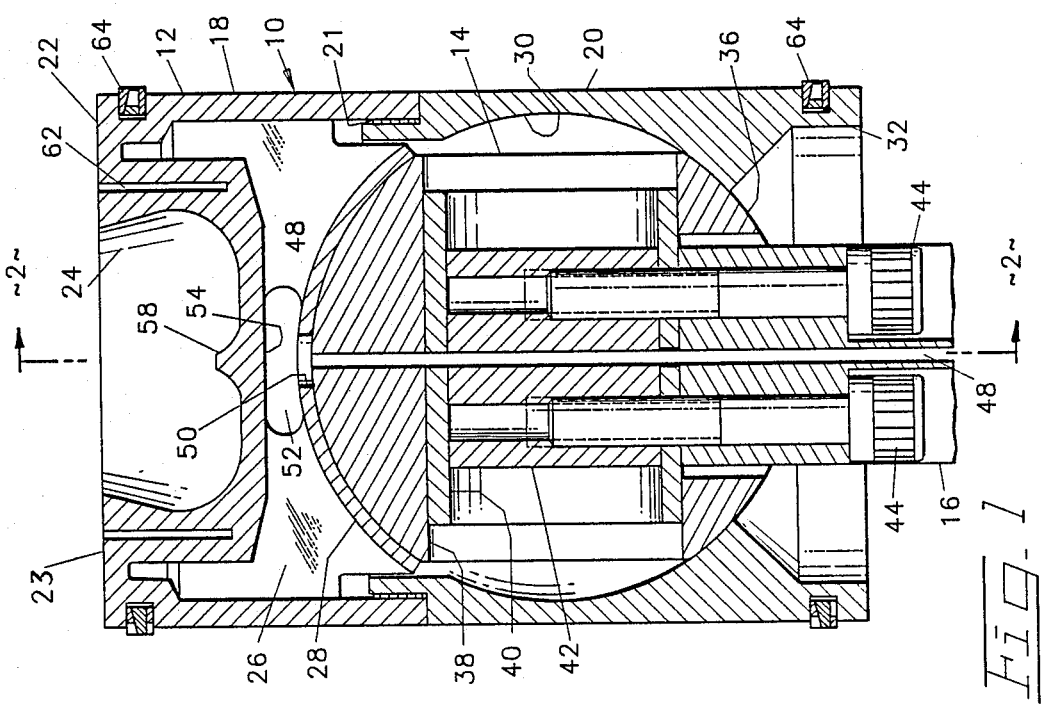

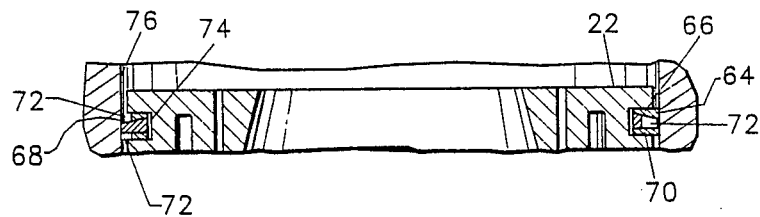
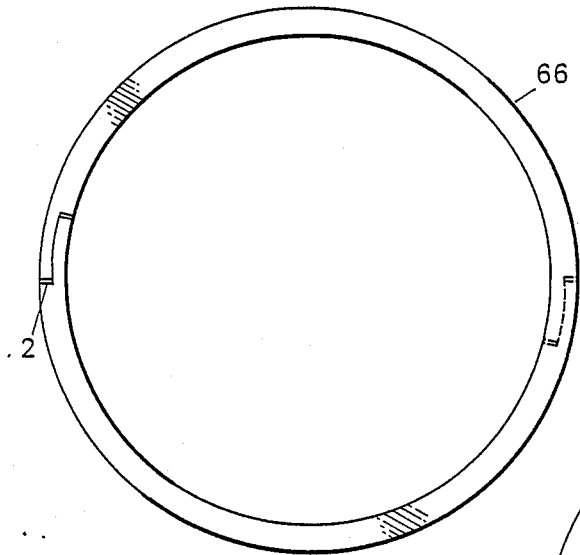
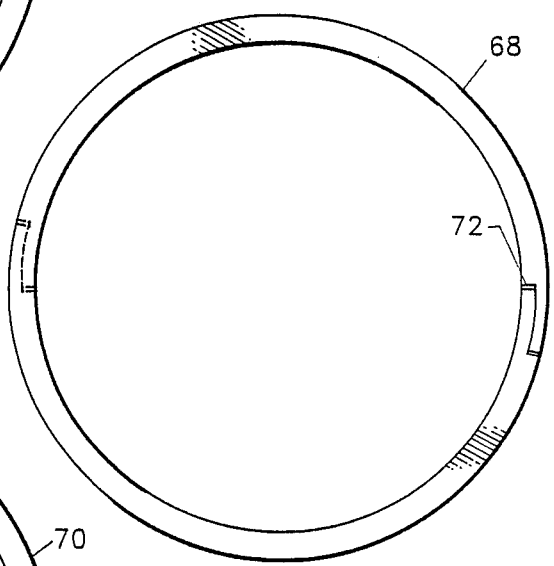
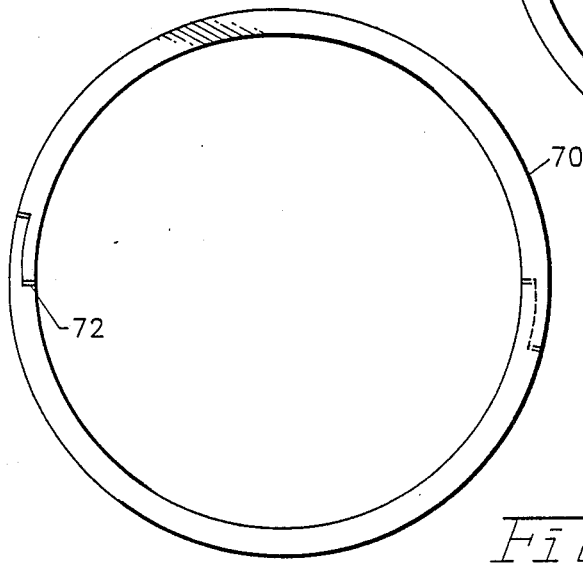

AXIALLY SYMMETRICAL PISTON FOR RECIPROCAL ENGINES

BACKGROUND OF THE INVENTION

This invention relates to a piston and wristpin assembly that permits the piston to have an axially symmetrical structure for use in high temperature, high pressure reciprocal engines. The piston and wristpin assembly is particularly useful for two-cycle diesel engines where thermal effects deform the symmetry of conventional pistons and where high thrust pressures of the piston at the connecting wristpin result in lubrication failures.

Piston and wristpin designs for conventional engines result in an asymmetric structure in the piston and a limited projection surface on the cylindrical wrist pin onto which all forces of the piston power stroke are transmitted. These two features of conventional design limit the permissible maximum temperatures and pressures in the combustion chamber. When excessive temperatures are encountered by a conventional piston, the piston expands in a nonuniform manner resulting in an overall asymmetry that increases friction and may result in piston slap.

Furthermore, in conventional combustion chamber designs the piston head or crown is subjected to the high temperatures of combustion and will thermally expand, particularly when the engine is running at higher speed and loads, such that acceptable tolerances at low speeds are insufficient to accommodate high speed, high load operations resulting in increased friction and excessive wear.

In conventional wristpin designs, the projected surface area of the cylindrical pin is approximately only 25-30% of the total cross sectional area of the piston. This limited effective surface area must bear the entire thrust forces of the piston during its power stroke. As precompression and combustion systems improve, a point is reached in which the effective surface area is no longer able to withstand the thrust forces and the thin lubrication film breaks down causing scoring and potential seizure of the bearing surface of the wrist pin. Even where this critical pressure per unit area is not reached, excessive wear occurs on a limited surface of the wrist pin since the reciprocal angular motion of the connecting rod results in virtually all wear being directed to a small top arcuate surface of the pin. This concentration of forces to a limited area also inhibits effective lubrication even under normal operating conditions.

The asymmetrical design of conventional cross pin pistons and the conventional designs of the connecting wristpin have inhibited the ability of engines to combust fuel at higher pressures and temperatures. This is a particular problem in two cycle engines where the piston has a minimal recovery from the high temperature power stroke before the next power stroke, unlike the four stroke cycle. Furthermore, when a two cycle system is adapted to diesel operation, with autocombustion of injected fuel, piston deformation and wrist pin overload become major considerations even under conditions of only moderate supercharging. The axially symmetric piston and the novel wrist pin structure of this invention resolve the problems created in conventional piston and wrist pin designs and allow engine systems to be created that substantially increase the operating pressures and temperatures without interfering deformation or expansion of the piston or failure in the wristpin lubrication.

SUMMARY OF THE INVENTION

This invention relates to a new assembly for a piston and wrist pin in a reciprocal, internal combustion engine. The purpose of the assembly is to permit engine operation at temperatures heretofore impractical. The construction of the piston and wrist pin are intimately related to achieve axial symmetry of the piston and the greatest effective surface area for the wristpin. To achieve the increased projected area, the wristpin is located in a spherical bearing configuration as differentiated from the cylindrical configurations of conventional designs. Being spherical, the projected surface area can comprise approximately 65% of the cross sectional area of the piston. Furthermore, the spherical bearing configuration of the wristpin permits the piston to be symmetrical in its axial configuration and allow the piston to freely rotate on a wrist ball to improve lubrication and uniform wear. As a further improvement, to reduce thermal expansion of the piston head or crown, the piston is designed with a recessed combustion chamber in the piston having a deep circular groove in the head, displaced from, but concentric with the perimeter of the recessed combustion chamber. This arrangement both allows cooling of the piston head proximate the piston chamber and allows stress release from thermal expansion concentrated in the zone around the recessed combustion chamber.

In its preferred embodiment, the piston includes a piston ring assembly which is designed to improve sealing without the excessive friction caused in conventional piston ring designs by high pressure combustion gases seeping behind the rings to force their expansion against the walls of the cylinder.

These features of the novel piston and wristpin spherical assembly are described in greater detail in the detailed description of the preferred embodiments following.

BRIEF DESCRIPTION OF THE DRAWINGS

FIG. 1 is a cross sectional view of the piston and wristpin assembly including a connecting rod shown fragmented.

FIG. 2 is a cross sectional schematic view of the assembly of FIG. 1 taken along lines 2—2 in FIG. 1 with the connecting rod at maximum angular displacement.

FIG. 3 is a partial cross sectional view of the ring assembly of the piston head in contact with a cylinder wall.

FIG. 4 is a plan view of the top ring.

FIG. 5 is a partial plan view of the central ring.

FIG. 6 is a plan view of the bottom ring.

DETAILED DESCRIPTION OF THE PREFERRED EMBODIMENTS

Referring now to FIGS. 1 and 2, the unique piston assembly designated generally by the reference numeral 10 is shown. The unique piston assembly includes a piston unit 12 and a wristpin unit 14. The wristpin 14 is connected to the end of a connecting rod 16 shown only in part in the drawings. The remaining portion of the connecting rod is of conventional design and the piston assembly 10 is suitable for use either in conventional engines or preferably two-cycle, high temperature and high pressure engines.

The unique design of the wristpin unit 14 has two major advantages inherent in its spherical design. First, the spherical design of the bearing of the wristpin unit allows the cylindrical piston unit to be of an axially symmetric or uniform configuration. This design permits uniform radial expansion such that the piston is not asymmetrically deformed because of a complex asymmetrical structure. Secondly, the spherical configuration of the wristpin unit presents a substantially greater projected surface for distributing thrust forces during the power stroke of the piston unit. As an added advantage, the wristpin unit need not be fixed about the axis of the piston. In this manner the piston is free to rotate and distribute lubrication and wear throughout the bearing surface of the piston unit. The piston unit 12 is a two part assembly having a piston head 18 threadably secured to a piston skirt 20 at the overlapping juncture 21. The piston head 18 has a crown 22 with top surface 23 having a central recessed combustion chamber 24. Internally the piston head 18 includes a series of symmetrically spaced ribs 26 which support a nearly hemispherical bearing cap 28. The use of ribs thermally isolates the bearing cap from the proximately positioned combustion chamber 24. The piston skirt 20 has a spherically hollowed internal surface 30 complimentary to the spherical surface of the bearing cap 28 forming a ball socket with a bottom opening 32 through which the connecting rod 16 projects.

The connecting rod 16 is attached to the substantially spherically shaped wristpin unit 14 constructed with an outer substantially spherical ball 36 with a hollow bore 38 into which a tubular mounting sleeve 40 containing a cylindrical anchor member 42 is installed. Opposed bolts 44 seated on side recesses 46 in the connecting rod 16 secure the connecting rod to the wristpin unit 14. A conventional oil passage 48 through the connecting rod 16, the sleeve 40, anchor member 42 and the ball 36 directs oil to an orifice 50 in the bearing cap 28 which functions as a reservoir for coating the bearing cap 28 and the wrist ball 36 with oil. Excess oil is allowed to pass into a bay 52 at the conflux of the ribs 26 where it cools the backwall 54 of the combustion chamber before returning down the inside of the piston assembly for lubricating the lower portion of the ball 36 proximate the bottom opening 32 of the skirt 20.

The assembled wrist pin unit 14 is installed in the piston assembly 10 with the piston crown separated from the piston skirt. The crown is then screwed tightly to the skirt entrapping the ball-shaped wristpin unit in the internal socket of the piston assembly. As shown, the piston assembly is axially symmetric and can rotate freely on the wristpin unit allowing even wear to the bearing surfaces as the connecting rod articulates in its pendulum-like motion during operation of the engine. This rotation allows the lubricant to be evenly distributed over the bearing cap of the piston head. If desired, a slight bias to encourage rotation can be included, for example, by a central boss 58 in the recessed combustion chamber 34 that has sloped blade-like ribs 60 as schematically shown in FIG. 2. The resulting small rotational bias applied to the piston by action of the fuel injection and combustion will result in a small degree of rotation during each stroke. In addition to the even wear of the wristpin bearing surfaces, the walls of the engine cylinders and pistons have improved wear patterns.

Since the piston assembly is constructed with a uniform axial symmetry, thermal expansions will be uniformly concentric. To substantially reduce thermal expansion, the recessed combustion chamber 24 is encircled by a deep, open cooling groove 62 which is open to the top surface 23 of the piston and receives compressed air on the compression stroke and releases the compressed air into the combustion gases during the expansion stroke. In addition to providing a cooling function to the combustion chamber 24, the groove 64 provides a structural expansion relief for the centrally isolated combustion chamber 24. In this manner a closer tolerance between the circumference of the piston unit and the internal wall of the cylinder can be maintained.

In addition to the cooler peripheral surface of the piston head, performance is improved by a novel piston ring assembly 64, shown also in FIGS. 3-6. The piston ring assembly includes a trapezoidal upper ring 66, a complimentary trapezoidal center ring 68 and a bottom flat ring 70. The rings have z-joint gaps 72, which in each ring is offset from the gap of the adjacent ring as schematically shown in FIGS. 3-6. The action of the trapezoidal rings results in a tight top and bottom fit to the ring assembly in the piston grooves 74. This prevents high pressure gases from seeping behind the ring and increasing the force of the expanding ring on the adjacent cylinder wall 76. The sealing pressure of the rings can then be restricted to the predetermined spring force of the ring as applied against the wall according to design criteria.

The isolated combustion chamber, the enlarged effective wristpin area, the symmetrical piston configuration and the ring assembly all combine to form a piston assembly that is suitable for extremely high pressures and temperatures of combustion.

While in the foregoing embodiments of the present invention have been set forth a considerable detail for the purposes of making a complete disclosure of the invention, it may be apparent to those of skill in the art that numerous changes may be made in such detail without departing from the spirit and principles of the invention.

What is claimed is:

1. A piston assembly for an internal combustion, reciprocal engine in which the piston assembly reciprocates with a compression stroke and an expansion stroke, the assembly comprising:

a cylindrical piston unit having a piston head with a top surface having a central, recessed combustion chamber therein and having a deep, open, circular groove arranged concentrically around the recessed combustion chamber, the recessed combustion chamber and the groove being of substantially the same depth for thermally isolating and cooling the combustion chamber and relieving the piston head of thermal expansions said groove being open to its full depth to the top surface of the piston head and constructed and adapted to receive compressed air on the compression stroke and release the compressed air during the expansion stroke.

2. The piston assembly of claim 1 wherein the piston unit has an axially symmetrical configuration.

3. The piston assembly of claim 2 comprising further a wrist pin unit and a connecting rod connected to the wrist pin unit, wherein the wrist pin unit has a substantially spherical ball and the piston unit has a substantially spherical internal socket means engageable with the ball of the wrist pin unit for connecting the connecting rod to the piston unit with limited articulation of the connecting rod and wherein the piston unit has an axis and is freely rotatable about the axis on the wrist pin unit.

4. The piston assembly of claim 3 wherein the piston unit has a piton skirt connected to the piston head, the piston head and piston skirt forming internally the socket means on interconnection.

5. The piston assembly of claim 1 wherein the piston head has a peripheral piston ring groove and piston ring assembly with a top trapezoidal ring, a center trapezoidal ring, and a flat bottom ring, wherein the top and center rings have opposed sloping faces in mutual engagement arranged for eliminating top and bottom spacing in the ring groove.

6. A piston assembly for an internal combustion, reciprocal engine, the assembly comprising:
   a cylindrical piston unit having an internal substantially spherical socket and a wrist pin unit having a substantially spherical ball engaged in the socket, the piston assembly including a connecting rod connected to the ball of the wrist pin wherein the piston unit has an axis, has an axially symmetrical structure and is freely rotatable about its axis on the wrist pin unit.

7. The piston assembly of claim 6 wherein the projected surface area of the ball of the wrist pin unit is at least half the cross sectional area of the cylindrical piston unit.

8. The piston assembly of claim 6 wherein the piston unit comprises a piston head and a piston skirt having an interconnection means and an internal structure forming the socket when interconnected.

9. The piston assembly of claim 8 wherein the ball of the wristpin unit has a core with a cylindrical sleeve and a cylindrical anchoring member in the core, and the connecting rod has bolts, the bolts engaging the anchoring member through the sleeve.

10. The piston assembly of claim 8 wherein the piston head has a substantially hemispherical bearing surface engaging the ball of the wrist pin, the bearing surface having a central orifice forming a lubrication bay for lubricating the bearing surface and the ball.

11. The piston assembly of claim 10 wherein the piston head has a central recessed combustion chamber with walls proximate the bearing surface.

12. The piston assembly of claim 11 wherein the lubrication bay is between the walls of the recessed combustion chamber and the bearing surface for cooling the piston head.

* * * * *